(12) United States Patent
Buchholz et al.

(10) Patent No.: US 9,534,643 B2
(45) Date of Patent: *Jan. 3, 2017

(54) LIQUID FRICTION CLUTCH

(71) Applicant: BorgWarner Inc., Auburn Hills, MI (US)

(72) Inventors: Thomas Buchholz, Stockach (DE); Wolfgang Sorg, Horgenzell (DE)

(73) Assignee: BorgWarner Inc., Auburn Hills, MI (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/530,780

(22) Filed: Nov. 2, 2014

(65) Prior Publication Data

US 2015/0053524 A1 Feb. 26, 2015

Related U.S. Application Data

(63) Continuation of application No. 13/386,940, filed as application No. PCT/US2010/044061 on Aug. 2, 2010, now Pat. No. 8,875,861.

(30) Foreign Application Priority Data

Aug. 12, 2009 (EP) .................................... 09010417

(51) Int. Cl.
*F16D 35/02* (2006.01)

(52) U.S. Cl.
CPC ............. *F16D 35/028* (2013.01); *F16D 35/02* (2013.01)

(58) Field of Classification Search
CPC ...... F16D 35/02; F16D 35/021; F16D 35/024; F16D 35/027; F16D 35/028; F16D 35/029
See application file for complete search history.

(56) References Cited

U.S. PATENT DOCUMENTS

| 3,458,020 | A | * | 7/1969 | Otto | ......................... F16D 35/02 |
| | | | | | 192/58.62 |
| 3,688,884 | A | * | 9/1972 | Perrin | ..................... F16D 35/02 |
| | | | | | 192/58.63 |
| 4,346,797 | A | | 8/1982 | Bopp | |
| | | | | (Continued) | |

FOREIGN PATENT DOCUMENTS

| DE | 19749342 A1 | 6/1999 | |
| DE | WO 2006131157 A1 | * 12/2006 | ........... F16D 35/021 |
| | (Continued) | | |

*Primary Examiner* — Ramya A Burgess
*Assistant Examiner* — David Morris
(74) *Attorney, Agent, or Firm* — Harness, Dickey & Pierce, P.L.C.

(57) ABSTRACT

A liquid friction clutch (1) having a housing (2, 3), a clutch disc (4)—rotatable relative to the housing (2, 3) and which is rotatably arranged on an end (5) of a shaft (6) which is mounted centrally within the housing (2, 3), which shaft (6) bears on its other end (8) a driveable active element (7). A working chamber (9) is positioned between the housing (2, 3) and the clutch disk (4). A storage chamber (10) is provided for the clutch fluid. A supply duct (11) leads from the storage chamber (10) to the working chamber (9). A stationary clutch part (13) relative to which the housing (2, 3) is rotatable, wherein a rotatably mounted pump element (14) is provided which, with the housing (2, 3), defines a shear gap (12).

16 Claims, 5 Drawing Sheets

(56) References Cited

U.S. PATENT DOCUMENTS

| | | | |
|---|---|---|---|
| 4,966,265 A * | 10/1990 | Wiese | B60K 17/351 |
| | | | 180/248 |
| 6,026,943 A | 2/2000 | Fuchs et al. | |
| 6,443,283 B1 | 9/2002 | Augenstein et al. | |
| 7,178,656 B2 | 2/2007 | Pickelman et al. | |
| 8,875,861 B2 * | 11/2014 | Buchholz | F16D 35/02 |
| | | | 192/58.61 |
| 2003/0006117 A1 | 1/2003 | Tilly et al. | |
| 2003/0133242 A1 | 7/2003 | Buchholz | |
| 2005/0023100 A1 | 2/2005 | Buchholz et al. | |
| 2009/0127051 A1 * | 5/2009 | Buchholz | F16D 35/024 |
| | | | 192/58.2 |
| 2013/0313062 A1 | 11/2013 | Buchholz | |

FOREIGN PATENT DOCUMENTS

| | | |
|---|---|---|
| EP | 1731787 A1 | 12/2006 |
| JP | H09210102 A | 8/1997 |
| KR | 1019980033441 | 3/1999 |
| WO | WO-2006/131157 A1 | 12/2006 |
| WO | WO-2008/080159 A1 | 7/2008 |

* cited by examiner

LIQUID FRICTION CLUTCH

CROSS REFERENCE TO RELATED APPLICATIONS

This application is a continuation of U.S. patent application Ser. No. 13/386,940 filed on Jan. 25, 2012 (now U.S. Pat. No. 8,875,861 issued on Nov. 4, 2014), which is a National Stage Entry of International Patent Application No. PCT/US2010/044061 filed on Aug. 2, 2010, which claims the benefit of European Patent Application No. 09010417.5 filed on Aug. 12, 2009.

TECHNICAL FIELD

The invention relates to liquid friction clutches.

BACKGROUND

A liquid friction clutch of said type is known from EP 1 731 787 B1.

Also, DE 197 49 342 A1 discloses a viscous clutch for driving motor vehicle air-conditioning compressors, in which, to control the filling level of fluid in a working chamber, the throughput of fluid through the pipe section adjoining an inlet section of a scoop pipe is controlled by means of a valve. Tests however yielded that such a valve causes problems in that it is extremely difficult to achieve acceptable performance results.

It is therefore an object of the present invention to provide a liquid friction clutch by means of which it is possible in a simple manner, without using a valve, to obtain a variable clutch fluid flow.

SUMMARY OF THE INVENTION

By means of the provision of a rotatably mounted pump element which, with the housing, defines a shear gap, it is made possible in a simple manner, by utilizing a rotational speed difference between the pump element and the housing or the primary side of the liquid friction clutch, to generate a variable volume flow from the storage chamber into the working chamber, without it being necessary for this purpose to additionally integrate a controllable valve into the flow path.

The particular advantages of the liquid friction clutch according to the invention include firstly that only a small quantity of clutch fluid is required, because on account of the above-explained arrangement, an active feed pump is formed in the oil reservoir, which with regard to the clutch fluid quantity is advantageous over the known utilization of centrifugal forces for filling the working chamber.

Furthermore, the response behavior of the liquid friction clutch according to the invention is faster on account of the smaller clutch fluid component.

An extremely compact design is also generated because the outer diameter of the storage chamber or of the reservoir can be made larger than the inner diameter of the working chamber.

The compact design is improved further in that, as already explained above, a variability of the clutch fluid flow is made possible without the use of a valve arrangement.

The pump element which builds up a pressure, with a volume flow being generated as a result of friction of the clutch fluid in the shear gap which is preferably kept small, can be mounted either on the stationary clutch part or clutch housing of the active element (for example pump wheel, impeller, direct-current compressor etc.) or it is also possible for said pump element to be mounted on the shaft of the liquid friction clutch.

The pressure which is built up, or the volume flow which is generated, is a function of the relative rotational speed of the rotatable pump element in relation to the housing, with it being possible for the relative rotational speed to be controlled for example by means of a compensation of the drag torque of the fluid friction pump in relation to the torque that is generated by an actuating mechanism or by a brake device which may for example be designed as an eddy-current brake. Said brake device may in principle be designed as any type of magnetic brake device or friction brake. In addition to the abovementioned eddy-current brake, further examples are electric motors, generators or else viscous brakes.

If an eddy-current brake is provided as a brake device, said eddy-current brake is actuated by means of a magnetic field which is generated in a solenoid or electromagnet which compensates the magnetic field of permanent magnets provided as a further part of the brake device. A brake device of said type may be used as a fail-safe facility such that the variable feed pump or the pump element rotates at maximum throughflow rate (minimum rotational speed), specifically in a situation in which no electrical energy is applied to the solenoid.

BRIEF DESCRIPTION OF THE DRAWINGS

Further details, advantages and features of the present invention will emerge from the following description of exemplary embodiments on the basis of the drawings, in which.

DESCRIPTION OF THE PREFERRED EMBODIMENTS

Figure 1A:
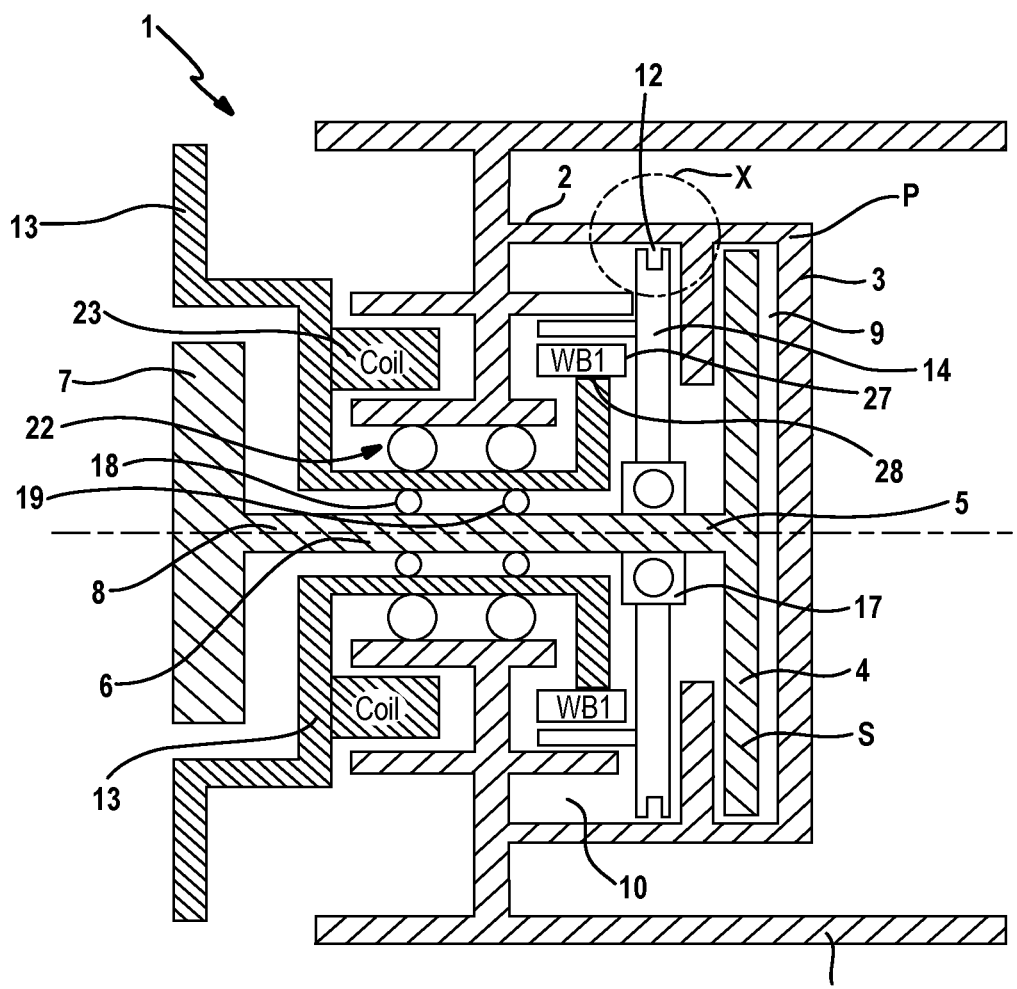
FIG. 1A shows a schematically highly simplified diagrammatic illustration of a liquid friction clutch according to an embodiment of the invention.

FIG. 1A shows a highly simplified schematic illustration of a liquid friction clutch 1 according to the invention which has a housing which is constructed in the conventional way from a housing body 2 and a cover 3.

Arranged in the housing 2, 3 is a clutch disk 4 which is rotatable relative to the housing 2, 3. Here, the clutch disk 4 is rotationally fixedly arranged on an end 5 of a shaft 6 which is mounted centrally within the housing 2, 3. Fixed to the other end 8 of the shaft is a drivable active element 7 which is illustrated in schematically simplified form and which may be designed for example as a pump wheel or as an impeller.

Figure 2:
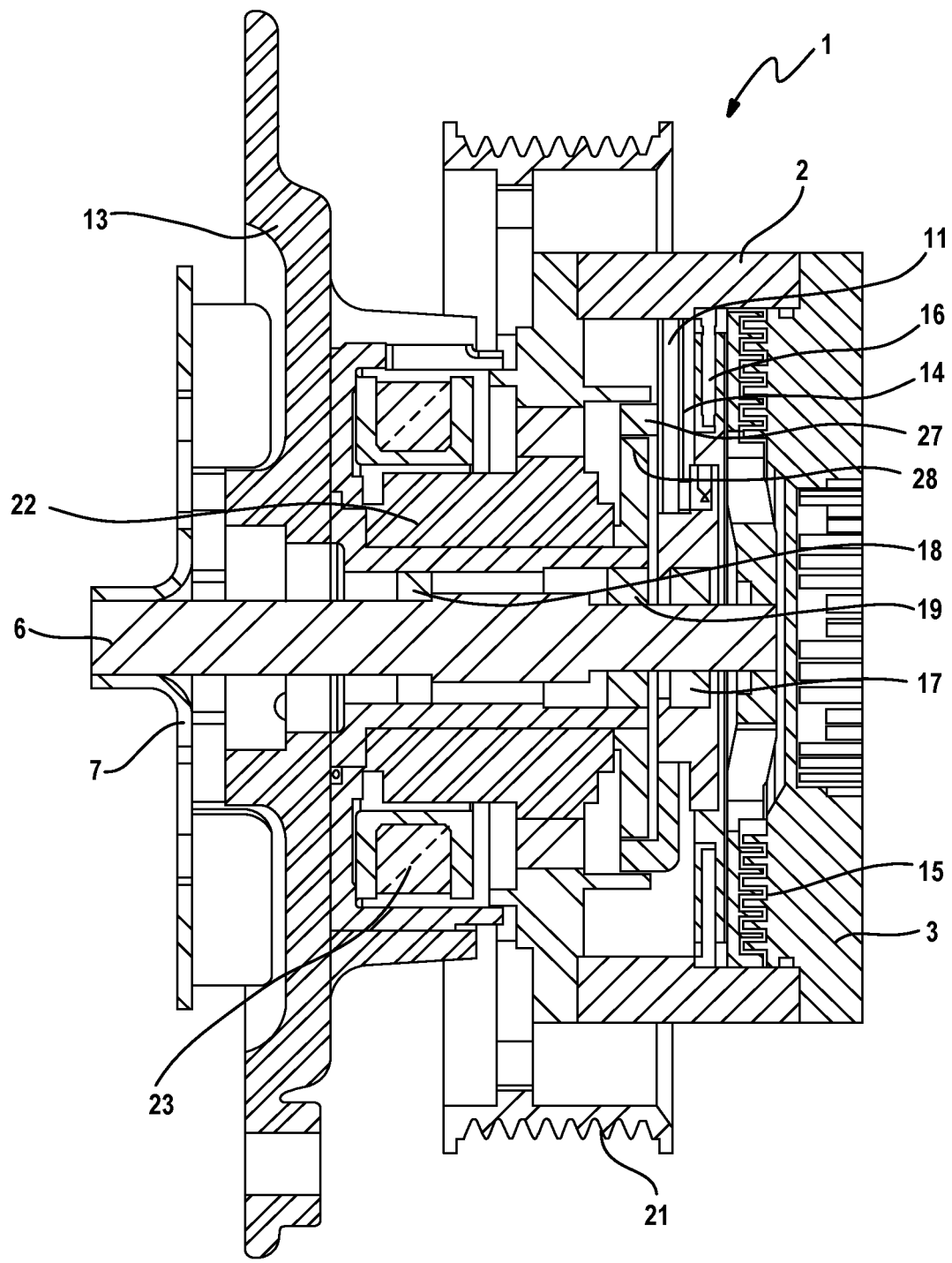
FIG. 2 shows a sectional illustration through one possible realization variant of the liquid friction clutch according to an embodiment of the invention illustrated as a diagrammatic illustration in FIG. 1.

A working chamber 9 is arranged between the housing 2, 3 and the clutch disk 4, which working chamber 9, as can be seen from FIG. 2, has working gaps 15 which make a transmission of torque possible on account of a shear action on the clutch fluid supplied to the working chamber 9.

Furthermore, a storage chamber 10 for said clutch fluid is provided, with a supply duct 11 (see FIGS. 2 and 3) leading from the storage chamber 10 to the working chamber 9.

As can be seen in particular from FIG. 2, a return pump system or a return feed pump 16 is also provided which serves for returning the clutch fluid from the working chamber 9 to the storage chamber 10.

A drive element 21, such as for example a belt pulley, is also connected to the housing 2, 3. The liquid friction clutch 1 also has a stationary clutch part 13 on which the housing 2, 3 is mounted via a main bearing 22. The stationary clutch part 13 is mounted on the shaft 6 via secondary bearings 18 and 19.

Figure 3:
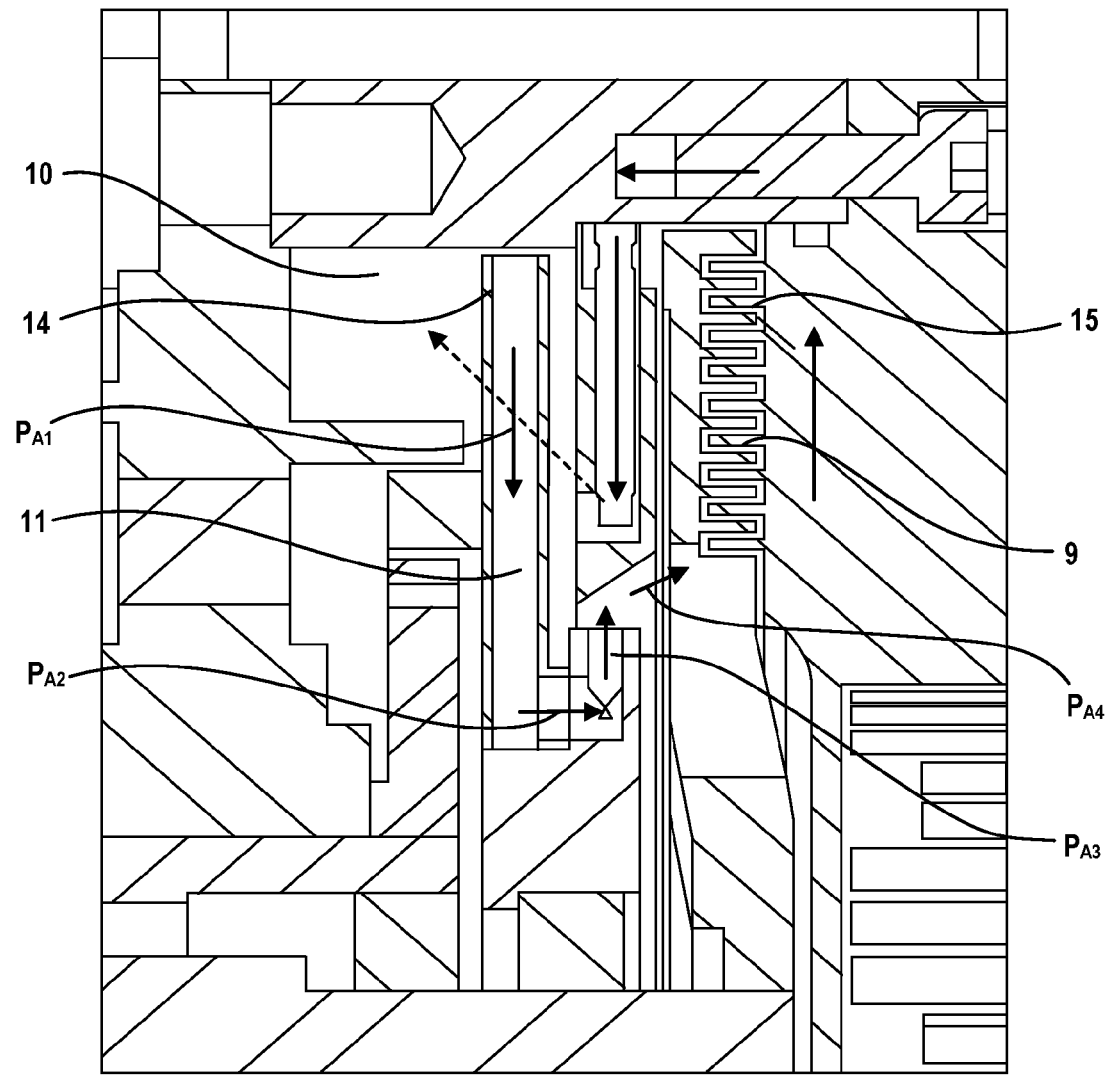
FIG. 3 shows a detail illustration from FIG. 2 for explaining the clutch fluid flow.

As is also shown by a juxtaposition of FIGS. 1 to 3, the liquid friction clutch 1 according to the invention is characterized by the provision of a pump element 14 which, in the example, is rotatably mounted on the shaft 6 by means of a pump element bearing 17. An alternative mounting of the pump element 14, for example on the stationary part 13, is however likewise possible.

Figure 1B:
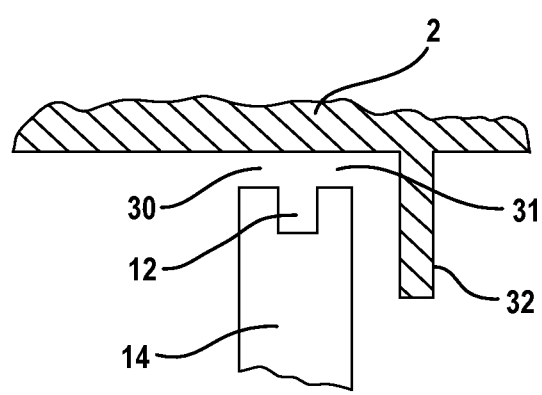
FIG. 1B shows a schematically highly simplified illustration of the detail X in FIG. 1A.

In the illustrated example, the pump element 14 has at its radial outer edge a shear gap recess 12 which, according to the detailed illustration in FIG. 1B, is sealed off with respect to the housing body 2 by means of sealing gaps 30 and 31. By means of this arrangement, a variable feed pump is formed which, as already explained in the introduction, permits a volume flow of clutch fluid from the storage chamber 10 to the working chamber 9 on account of a rotational speed difference to be generated between the pump element 14 and the housing 2, 3. Here, it should be emphasized that the arrangement shown on an enlarged scale in FIG. 1B is not restricted to a radial alignment of the shear gap recess 12. Furthermore, an axial configuration of the shear gap recess 12 together with corresponding sealing gaps relative to the axially adjacent housing part 32 would also be conceivable.

With regard to the volume flow explained above, reference should be made in particular to the detailed illustration of FIG. 3, in which the volume flow from the storage chamber 10 into the working chamber 9 is shown by the arrows $P_{A1}$ to $P_{A4}$. The other arrows shown indicate the returned volume flow from the working chamber 9 into the storage chamber 10. The volume flow from the storage chamber 10 into the working chamber 9 is generated by the above-explained pump element 14 in conjunction with the explained shear gap recess 12. Here, the pump element 14 and the shear gap recess 12 form a variable feed pump, the operating principle of which is based on the rotational speed difference explained in the summary.

Figure 4:
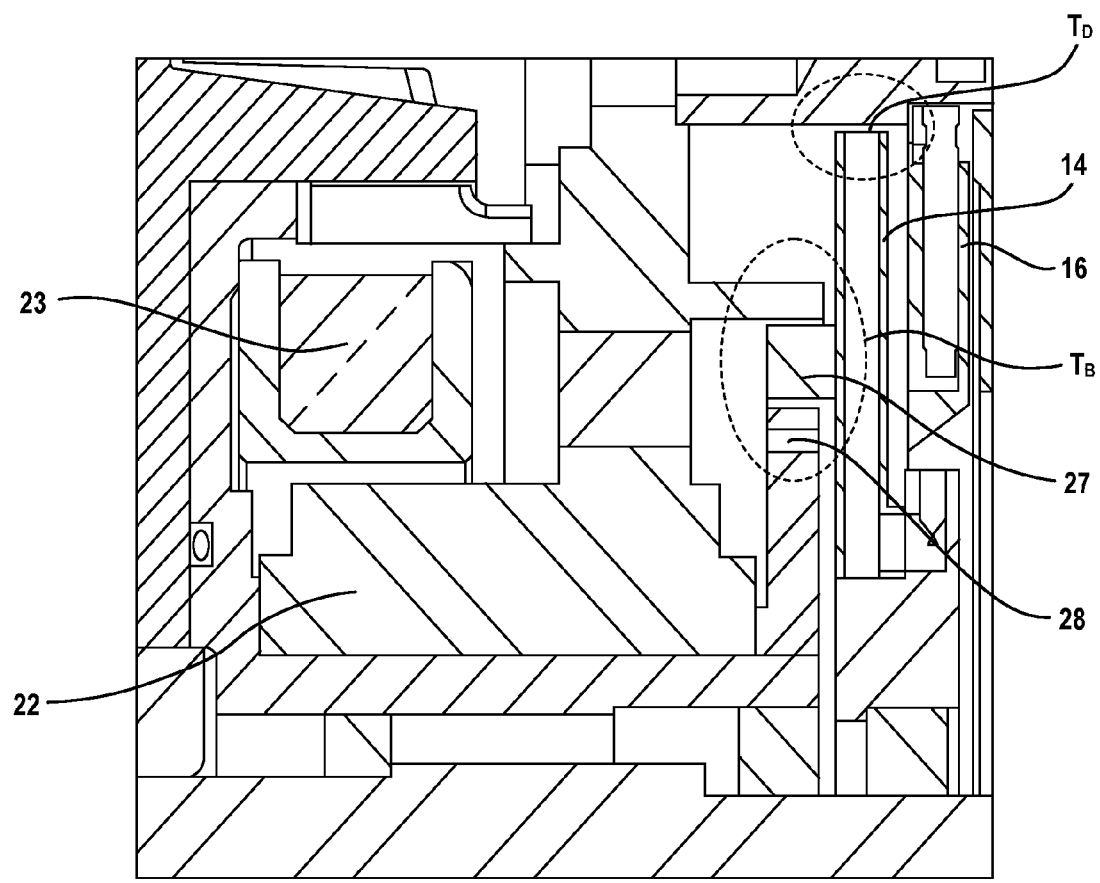
FIG. 4 shows an enlarged detail illustration from FIG. 2 for explaining the magnetic flux in the liquid friction clutch according to an embodiment of the invention if an eddy-current brake is provided as a brake device.

To generate said rotational speed difference, it is possible to design the pump element 14 such that it can be braked. For this purpose, in FIGS. 1A, 2 and 4, an eddy-current brake is provided as a brake device, wherein any other type of suitable brake device in the form of a magnetic brake device or a friction brake is however also conceivable.

The illustrated eddy-current brake has firstly an electromagnet or solenoid 23 which is mounted at the position shown in FIG. 2. Furthermore, the brake device has permanent magnets 28 which are arranged adjacent to an eddy-current brake ring 27 (composed for example of copper) as can be seen in detail from the illustration of FIGS. 1A and 2 and from the enlarged illustration of FIG. 4. Here, in FIG. 4, the braking torque that can be generated by the brake device is generated in the area designated by the dashed oval circle $T_B$, while the torque that can be generated by the pump element 14 is generated in the area designated by the dashed oval circle $T_D$.

Figure 5:
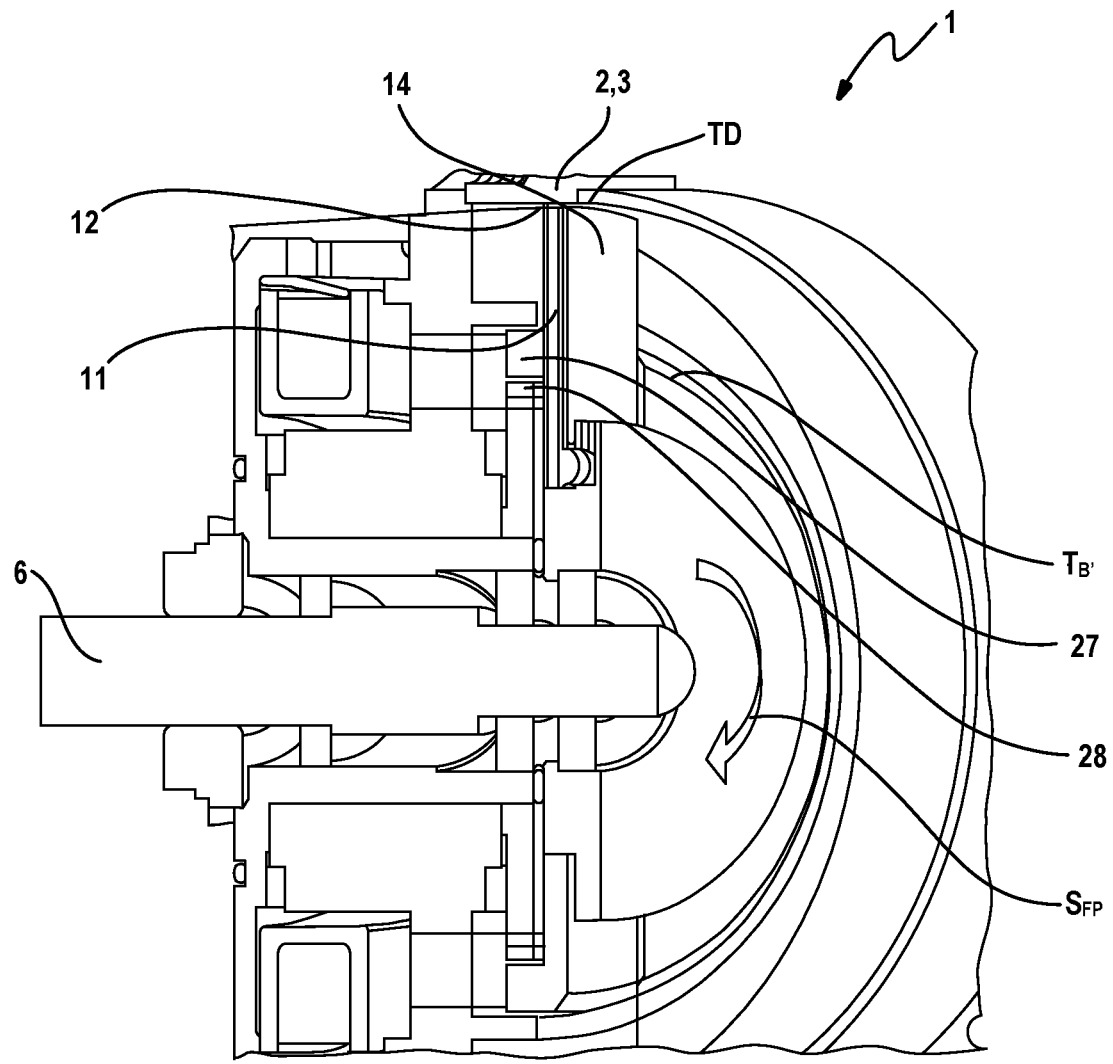
FIG. 5 shows a schematically slightly simplified perspective illustration of the liquid friction clutch according to FIG. 2.

For further explanation, in particular of these latter components, reference may also be made to FIG. 5.

In addition to the written disclosure of the invention, reference is hereby explicitly made to the diagrammatic illustration thereof in FIGS. 1A, 1B and 2 to 5.

Although the invention has been described with respect to preferred embodiments, it is to be also understood that it is not to be so limited since changes and modifications can be made therein which are within the full scope of this invention as detailed by the following claims.

The invention claimed is:

1. A liquid clutch comprising:
   a stationary member;
   a housing member that is rotatable about an axis relative to said stationary member;
   a clutch disk positioned in said housing member, said clutch disk being rotatable about said axis relative to the housing member;
   a shaft having a first end and a second end, the first end being coupled to the clutch disk for rotation therewith;
   a driveable active element that is coupled to the second end of the shaft for rotation therewith;
   a working chamber positioned in said housing member;
   a storage chamber for clutch fluid in said housing member;
   a supply duct coupling said storage chamber and said working chamber in fluid communication;
   a PUMP element that is rotatable relative to said stationary member and said housing, said PUMP element cooperating with said housing to define a shear gap; and
   a brake device for braking said pump element.

2. The liquid friction clutch as described in claim 1, wherein said brake device is designated as a magnetic brake device.

3. The liquid friction clutch as described in claim 1 wherein said brake device comprises a friction brake device.

4. The liquid friction clutch as described in claim 1 wherein said brake device comprises a solenoid, a permanent magnetic and an eddy-current ring.

5. A liquid clutch comprising:
   a stationary member;
   a housing member that is rotatable about an axis relative to said stationary member;
   a clutch disk positioned in said housing member, said clutch disk being rotatable about said axis relative to the housing member;
   a shaft having a first end and a second end, the first end being coupled to the clutch disk for rotation therewith;
   a driveable active element that is coupled to the second end of the shaft for rotation therewith;
   a working chamber positioned in said housing member;
   a storage chamber for clutch fluid in said housing member;
   a supply duct coupling said storage chamber and said working chamber in fluid communication; and
   a PUMP element that is rotatable relative to said stationary member and said housing, said PUMP element cooperating with said housing to define a shear gap;
   wherein the shear gap is delimited with respect to the housing by two sealing gaps.

6. A liquid friction clutch comprising:
a stationary member;
a housing member that is rotatable about an axis relative to said stationary member;
a shaft member rotatably mounted in said housing member;
a clutch disk mounted on said shaft member adjacent one end of said shaft member and a driveable active member positioned adjacent the other end of said shaft member;
a working chamber between said housing member and said clutch disk;
a storage chamber in said housing member;
a supply duct fluidly coupling said storage chamber to said working chamber;
a pump member positioned in said housing member and rotatable about said axis relative to said stationary member and said housing member, said pump member separated from said housing member by a first sealing gap, said pump member having an outer edge with a shear gap recess formed therein; and
a braking member for braking said pump element.

7. The liquid friction clutch as described in claim 6 wherein the separation of said pump member and said housing member comprises a second sealing gap.

8. The liquid friction clutch as described in claim 6 wherein said braking member comprises a magnetic brake device.

9. The liquid friction clutch as described in claim 6 wherein said braking member comprises a friction brake device.

10. The liquid friction clutch as described in claim 6 wherein said pump member is rotatably mounted on said stationary part.

11. The liquid friction clutch as described in claim 6 wherein said pump member is rotatably mounted on said shaft member.

12. The liquid friction clutch as described in claim 6 wherein said braking member comprises a solenoid, a permanent magnet and an eddy-current brake ring.

13. A liquid friction clutch comprising:
a stationary member;
a housing member rotatably positioned relative to said stationary member;
a shaft member rotatably mounted in said housing member;
a clutch disk mounted on said shaft member adjacent one end of said shaft member and a driveable active member positioned adjacent the other end of said shaft member;
a working chamber between said housing member and said clutch disk;
a storage chamber in said housing member;
a supply duct fluidly coupling said storage chamber to said working chamber;
a pump member positioned in said housing member and rotatable about said axis relative to said stationary member and said housing member, said pump member separated from said housing member by a shear gap; and
means for slowing rotation of said pump member relative to said stationary member.

14. The liquid friction clutch as described in claim 13 wherein said rotation slowing means comprises a magnetic brake device.

15. The liquid friction clutch as described in claim 13 wherein said rotation slowing means comprises a friction brake device.

16. The liquid friction clutch as described in claim 13 wherein said rotation slowing means comprises a solenoid, a permanent magnet and an eddy-current brake ring.

* * * * *